(No Model.) 2 Sheets—Sheet 1.
L. F. WAUTHIER.
MACHINE FOR SOWING SEED IN LINES, &c.
No. 591,312. Patented Oct. 5, 1897.
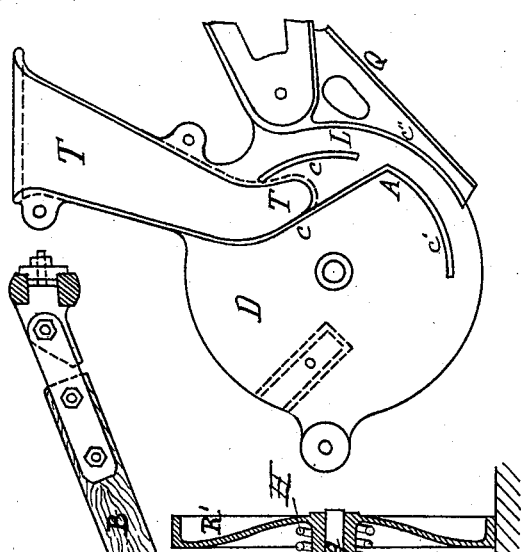
Fig. 4
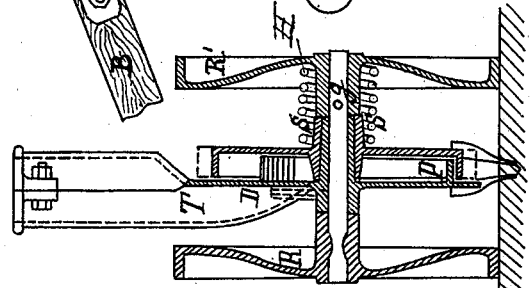
Fig. 2
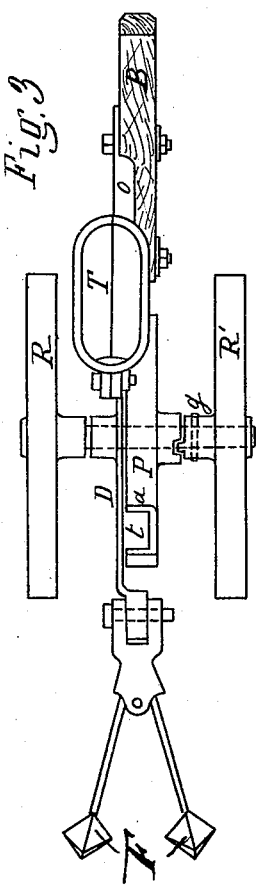
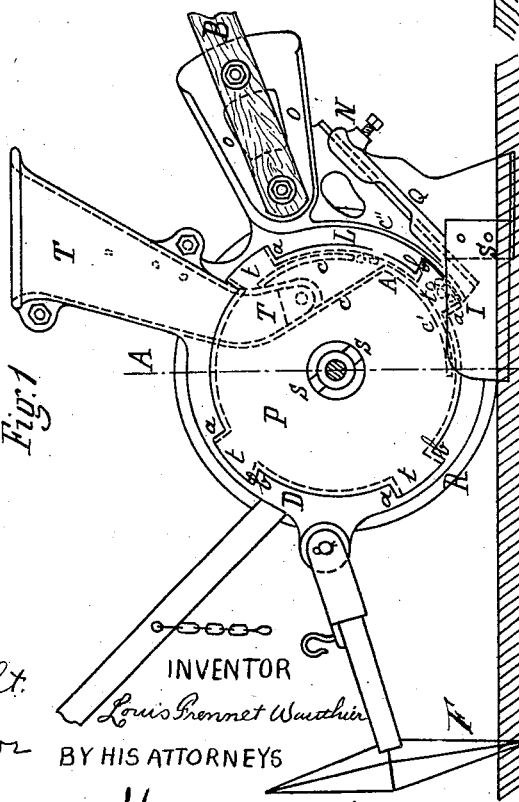
Fig. 1
Fig. 3
—WITNESSES—
F. W. Wright
S. C. Connor
INVENTOR
Louis Bennet Wauthier
BY HIS ATTORNEYS
Howson and Howson (No Model.) 2 Sheets—Sheet 2.

L. F. WAUTHIER.
MACHINE FOR SOWING SEED IN LINES, &c.

No. 591,312. Patented Oct. 5, 1897.

WITNESSES:
F. W. Wright
J. C. Connor

INVENTOR
Louis Frennet Wauthier
BY Howson and Howson
HIS ATTORNEYS.

UNITED STATES PATENT OFFICE.

LOUIS FRENNET WAUTHIER, OF LIGNY, BELGIUM.

MACHINE FOR SOWING SEED IN LINES, &c.

SPECIFICATION forming part of Letters Patent No. 591,312, dated October 5, 1897.

Application filed May 7, 1897. Serial No. 635,566. (No model.)

*To all whom it may concern:*

Be it known that I, LOUIS FRENNET WAUTHIER, operative, a citizen of Belgium, residing at Ligny, Belgium, have invented a certain new and useful Machine for Sowing Seeds in Lines and in Separate Groups, of which the following is a specification.

All agriculturists who are engaged in the cultivation of sugar-beet root are aware of the numerous advantages resulting from regular sowing in groups. The results of this new system of planting may be thus summed up:

First. The quantity of seed now used will be practically reduced by some sixty-five or seventy per cent.

Second. The labor required to space the plants after they have sprouted will be entirely saved, since this operation is mechanically done in sowing.

Third. The number of seeds in each group may vary from two to six or seven. As they are generally arranged in the furrow thus, 0000 00000 00 000 0000 00000 00, the separation, so as to leave only one for each hill, will be effected with more ease and certainty without damaging the roots of neighboring plants.

Fourth. Finally, a last point on which cultivators and sugar manufacturers have long been agreed, a field of beets where the plants are regularly distanced apart by equal intervals gives a return in weight and sugar very superior to fields in which this essential condition is absent.

These results I have obtained in my sowing apparatus forming the subject of this invention, which I will now describe by the aid of the accompanying drawings.

Figure 7:
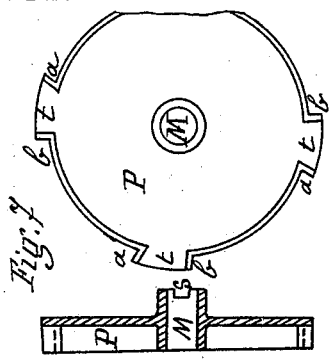
Figure 8:
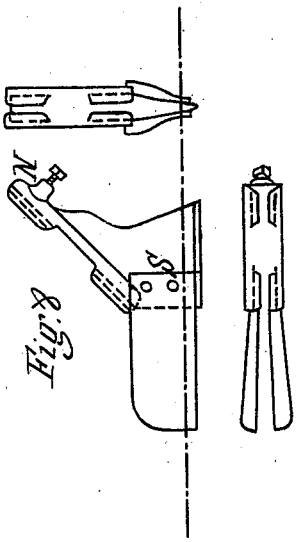
Figure 6:
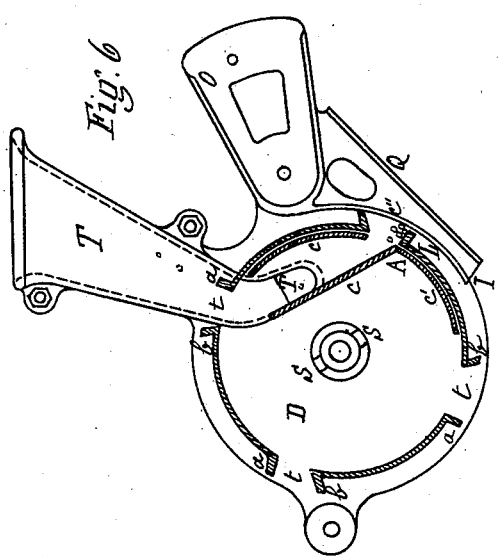
Figure 5:
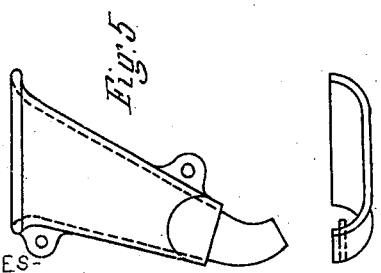
Figure 9:
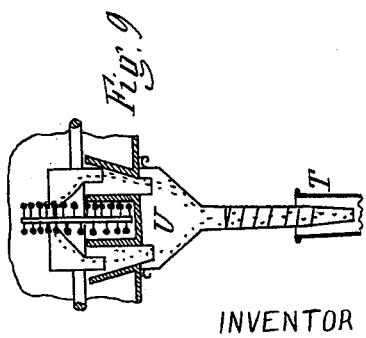

In the annexed drawings, Figures 1, 2, and 3 show the apparatus in side view, vertical section, and plan. Figs. 4 and 5 show the stationary disk and its hopper. Fig. 6 is a longitudinal section of the stationary disk. Fig. 7 shows the distributing-disk. Fig. 8 shows the plow; and Fig. 9 shows an improvement in the distribution of the spoon-disks of the seed-case, which will be explained hereinafter.

The apparatus shown in Figs. 1, 2, and 3 can be adapted for all kinds of seeds, provided it be in the first place provided with the new arrangements required for the method of planting in separate groups.

The apparatus is carried on two small disk-wheels R R', the one having its nave united integral with the iron axle, while the other is fixed to the axle by a pin $g$. Between these carrying-wheels is a stationary disk D, which is loose on the axle and remains upright, notwithstanding the rotation of the axle, having an ear O and a piece of wood B, connecting it to the ordinary sowing apparatus. The disk D has on one of its sides a hopper T, leading the seeds from the tube of the sower to the lower part of the hopper. The disk has through it an opening to let the seeds pass to the other side, where they slide along a passage between partitions C, one of them straight, the other curved. The straight partition terminates with a curved part $c'$, directed downward. At the periphery of the disk D is another partition $c''$, which forms with $c'$ a circular duct in continuation of the former. Against the disk D and on its nave I place a second disk P, which by projections $s$ is clutched to the wheel R', so as to turn with it. This disk has at its periphery a flange of the same height as the partitions of D, and having openings $t$, with side flanges $a\,b$. The close contact of the two disks is preferably insured by a helical spring H, as shown in Fig. 2, interposed between the wheel R' and the disk P.

The stationary disk has a slide Q, to which is attached by a screw N the plow S, the depth of which in the ground can thus be regulated as desired. This plow has the special characteristic that it cuts the furrow in form of a V, so as to prevent the seeds from accumulating in a space too narrow. To the rear of the disk D are jointed two claws F, which close the furrow containing the seeds.

It has been said above that Fig. 9 shows an improvement in the arrangement of the spoon-disk of the seed-case. I speak of "spoon-disks" because for the cultivation of beets it is the arrangement usually employed, especially in the systems of Smyth, Garret, &c.; but it is to be understood that I may employ my improvement in combination with any other system of distribution by force or otherwise. The improvement consists in this that instead of employing a single series of spoons for each plow I employ two, so as to obtain a kind of continuous distribution, to which is to be attributed the regularity of the groups. With this idea it may be readily understood that the dimensions of the spoons should be so regulated that each in the course of its rotation should carry one or at most two seeds at a time, unless from some unforeseen circumstance it should be desired to sow a greater quantity of seed, in which case apparatus distributing a larger quantity may be employed. Further, and this is the essential point, I cause the seeds to pour from the two sets of spoons of one plate into a single tube, and consequently into one hopper T, mentioned above, by interposing between the two ordinary funnels of the spoon-plate and the single tube a sufficiently large funnel V. In this way the running of the seeds is continuous and much more regular than formerly.

Such being the apparatus, its operation may be readily understood.

The spoons of the two sides of a plate successively pour one or two seeds into the funnel and the common tube, and these seeds slide by the hopper T to the point A, where they are retained by the flange of the moving disk P until it presents one of its openings $t$. The seeds then fall into the space between the stationary sides $c'$ and $c''$ and the moving sides $a$ and $b$, forming a kind of box which carries them down, and then, as the partition $c''$ terminates, the seeds fall into the furrow formed by the plow.

As stated above, the furrow being of V form the few seeds arrange themselves in line and not in a heap, and when they sprout it is very easy to remove the young plants in excess without injuring the plant that is to remain, as too often happens when the seedlings are grouped too closely together.

It can be readily seen on the drawings that the road traversed by the seeds as they are led by the flange of the moving disk is very short, so that there is no fear of the chokings which occur in other systems due to dust or the presence of foreign bodies—such as small stones, fibers attached to the seeds, &c.—as these bodies find room between the sides $a$ and $b$. Even if the circular passage between $c'$ and $c''$ should receive soil it would be immediately cleared by the passage of the ribs $a$ and $b$.

As the plow is attached to a slide, the furrow can be cut to any depth required to suit the character of the sowing. I think, therefore, that my sowing apparatus will give the following results: First, regularity in taking the seeds from the general case; second, regularity in the working of the apparatus which is not subject to chokings or stoppages; third, regularity in the depth to which the seeds are buried; fourth, power of changing this depth as may be required, and, fifth, regularity in the position of the seeds of each group in line. Under these conditions my apparatus should give the best results.

Having thus described the nature of this invention and the best means I know for carrying the same into practical effect, I claim as my invention—

1. A sowing apparatus for sowing groups of seeds in lines with intervals, comprising two sets of seed-spoons, a single funnel V, a hopper T, in combination with a stationary disk D having two partitions $c'$, $c''$ and a moving disk P having two flanges $a\ b$, substantially as described.

2. In a sowing-machine for sowing groups of seeds in line, the combination of a stationary disk carrying on one side a hopper and on its other side partitions, with a moving disk having a flange which retains the seeds until the moment when an opening lets them pass, and sides to then carry the seeds along the circular passage formed by the partitions, as and for the purposes set forth.

3. In a sowing-machine for sowing groups in line, a sowing-plow S mounted to slide with a setting-screw so as to vary at will the depth of the furrow, this plow cutting the furrow exactly at the place where the seeds are to be deposited in it, and having its lower side formed as an edge, substantially as described.

In testimony whereof I have signed my name to this specification, in the presence of two subscribing witnesses, this 27th day of April, A. D. 1897.

LOUIS FRENNET WAUTHIER.

Witnesses:
 H. GUGEBOS,
 GUST PIERRE.